Patented Mar. 15, 1932

1,849,246

UNITED STATES PATENT OFFICE

EDWARD ARTHUR MURPHY, OF WYLDE GREEN, AND ALFRED NIVEN, OF BIRMINGHAM, ENGLAND, ASSIGNORS TO DUNLOP RUBBER COMPANY LIMITED, OF BIRMINGHAM, ENGLAND, A BRITISH CORPORATION

METHOD OF MAKING ARTICLES FROM ORGANIC SUBSTANCES

No Drawing. Application filed September 6, 1929, Serial No. 390,855, and in Great Britain October 6, 1928.

This invention consists in a method for producing from aqueous dispersions of organic substances articles which have provided on their surfaces coloured jazz-type patterns or ornamentations and it consists also in a method for imparting coatings of coloured jazz-type patterns or ornamentations to surfaces of articles or materials.

Since the invention is particularly applicable to the manufacture of soft or hard rubber articles provided with coloured jazz-type patterns or ornamentations and for imparting to the surface of materials coatings of soft or hard rubber having coloured jazz-type patterns or ornamentations, it will further be described with reference to dispersions of rubber such as rubber latex, without, however, being limited thereto.

According to the invention the method consists in introducing a shape or former into a bath containing at least two mixings of aqueous dispersions of rubber and prepared in the manner hereinafter described and then withdrawing the shape or former or surface with its deposit. or alternatively inserting the shape or former or surface in the bath before it is prepared then withdrawing the shaper, former or surface from the bath after it has been prepared.

According to the invention a bath may be prepared in the following manner:—

A main quantity of latex mixing of natural colour or artificially coloured and preferably of fairly high viscosity is placed in the bath and then at least one smaller quantity of a latex mixing preferably of the same viscosity as the main quantity but of different colour thereto is placed on the surface of the main quantity. If desired the two or several mixings may be caused to intermingle by a gentle irregular movement of the surface. Alternatively the two or several mixings may be left undisturbed until the shape or former or surface is introduced therein or if within the latex, withdrawn therefrom.

If it is desired to produce a handle grip the shape or former may be rotated in any regular or irregular manner, during its introduction into the prepared bath, e. g. first in one direction, then in the other. Where, however, it is desired to manufacture a tobacco pouch the former is preferably dipped straight into the mixture without any irregular movement.

The subsequent setting of the deposits can be effected merely by drying, with or without heating, or by the immersion of the deposits in any suitable dehydrating and/or setting solution.

When a polished metal or glass former has been used, it is found that in order to obtain a good gloss the deposit should not be stripped from the former until it is dry and if possible, partially vulcanized.

The dispersions of organic substances may, for example, be natural or artificial dispersions of rubber or other natural resins in a concentrated non-compounded or compounded non-vulcanized or vulcanized condition and may be such as to yield when dry and vulcanized either soft or hard rubber products.

If dipping is effected in the normal way, to give articles which are subsequently to be stripped from the formers a "jazz" effect, this "jazz" effect is produced on or in the rubber surface which is adjacent the surface of the former or shape, so that in order to bring the "jazz" effect to the outside of the finished article the latter must be turned inside out. If this is undesirable or impossible as in covering articles or surfaces with a rubber coating which is not to be removed, an external "jazz" effect can be obtained by inserting the surface to be coated into the bath before it is prepared and then after preparing the bath withdrawing the surface through the multicoloured surface of the bath.

An example of a main latex mix suitable for the production of a jazz handle grip is:—

| Rubber as latex | 55 parts—expressed as dry rubber. |
|---|---|
| Sulphur | 2 parts |
| Zinc diethyldithiocarbamate | 0.4 part |
| Zinc oxide | 3.0 parts |
| Whiting | 18. parts |
| Barytes | 17.6 parts |
| Pigment—e. g. ultramarine | 4. parts |
| | 100.0 |

Upon this main latex mix there is placed in small quantities, one or more latex mixes preferably of similar composition except that they contain different colours. The total amount of solids in the main latex mix is approximately 73%, while the ammonia content on the total solids may conveniently be 0.1%.

The following illustrates the production of a handle grip having a "jazz" effect:—a shape used in the formation of a handle grip is dipped into the bath prepared as above and during its introduction is rotated in an irregular manner, e. g. first in one direction and then in the other. The shape with its deposit on withdrawal from the bath may be introduced at a uniform rate into a saturated common salt solution heated to 70°–75° C., wherein it may remain for 15 to 20 minutes for the purpose of dehydrating and setting the deposit. The shape together with its deposit is then removed and placed in boiling water for a few minutes after which the deposit can if desired be stripped from the shape. If, however, a good gloss is required the period in the dehydrating and setting bath may be shorter, but the shape and deposit after washing must be placed in an oven at about 100° C., for example, a steam oven for one hour before the deposit is stripped. Final vulcanization may be effected in any suitable known manner.

Where it is desired that a finished article should retain a good appearance it may be desirable to desulphurize the article at this stage by placing it in boiling 10% caustic soda solution for 20 minutes and then in boiling water for 20 minutes with subsequent drying.

In the production of a tobacco pouch the procedure may be the same as that given for a handle grip except that the shape may be dipped straight into the mix without rotary movement. In this case, however, a mix having a higher rubber content may be preferred.

Such a mix is for example:—

| | |
|---|---|
| Rubber as latex | 73 parts—expressed as dry rubber |
| Sulphur | 2.5 parts |
| Zinc diethyldithiocarbamate | 0.4 part |
| Zinc oxide | 3.0 parts |
| Whiting | 5.0 parts |
| China clay | 6.1 parts |
| Iron oxide (colouring matter) | 3.0 parts |
| Transformer oil | 7.0 parts |
| | 100.0 parts |

The total amount of solids on the concentrate is again approximately 73%.

Example of the aqueous dispersions containing organic materials are natural or artificial dispersions of rubber, gutta-percha, balata, or the like vegetable resins, if required in a preserved, compounded and/or concentrated condition. The aqueous dispersions may, if desired, contain such added substances as factice, rubber waste, rubber reclaim, mineral rubber, synthetic rubber, vulcanizing agents, accelerators, additional preservatives, dyes and filling materials of the ordinary type, as well as such special materials as leather dust, cork dust, fibres, metal dust and colloidal metals. Such dispersions may also have admixed therein such artificial resins as phenol-aldehyde, protein aldehyde and/or urea-aldehyde condensation products.

Various modifications may be made by those skilled in the art without departing from the invention as defined in the appended claims.

What we claim is:

1. A method of producing from aqueous dispersions of organic substances particularly of rubber, articles which have provided on their surfaces coloured jazz-type patterns or ornamentations and for imparting coatings of coloured jazz-type patterns or ornamentations to surfaces of articles or materials which comprises in introducing a former into a bath containing at least two aqueous dispersions containing different coloured pigments and thereafter withdrawing the former with its deposit.

2. A method as claimed in claim 1 wherein the former is inserted in the bath before it is prepared and then after preparing the bath in the manner aforesaid withdrawing the former through the coloured or multi-coloured surface of the bath.

3. A method as claimed in claim 1 wherein the setting of deposits is effected by drying.

4. A method as claimed in claim 1 wherein the deposits are set by immersion of the deposits in a dehydrating and setting solution.

5. A method as claimed in claim 1 wherein the coatings are subsequently vulcanized on the former.

6. A method as defined in claim 1 wherein the coatings are stripped from the former and subsequently vulcanized.

In witness whereof, we have hereunto signed our names.

E. A. MURPHY.
ALFRED NIVEN.